July 24, 1928.
S. CAMPBELL
1,677,953
IMPLEMENT FOR FACILITATING THE HANDLING OF ANIMALS
Filed July 5, 1927
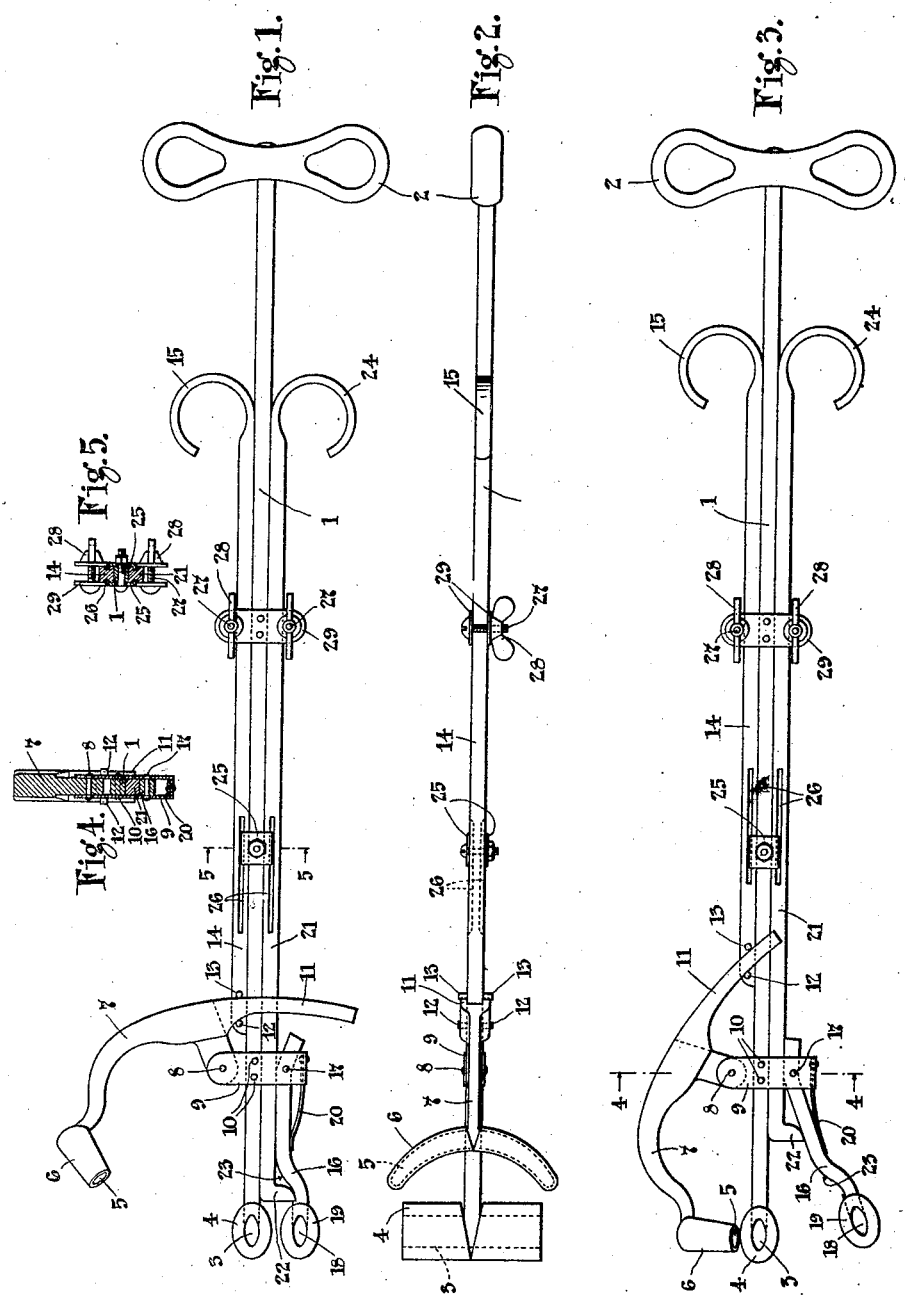
SAMUEL CAMPBELL.
INVENTOR.
By Marks & Clerk
ATTORNEYS.

Patented July 24, 1928.

1,677,953

UNITED STATES PATENT OFFICE.

SAMUEL CAMPBELL, OF CHARLOTTETOWN, PRINCE EDWARD ISLAND, CANADA.

IMPLEMENT FOR FACILITATING THE HANDLING OF ANIMALS.

Application filed July 5, 1927, Serial No. 203,653, and in Canada May 16, 1927.

This invention relates to implements for facilitating the capture and handling of animals, especially foxes and particularly to the kind of implement which comprises a member which the animal seizes between its teeth and means adapted to be brought into engagement with the animal's nose to prevent it from releasing its grip on the implement so long as the operator desires.

The invention has for its object to provide an improved implement of this kind and the principal feature consists in the provision of means for forcibly opening an animal's mouth to any desired extent for the purpose of inspection, administration of medicine or the like.

In the accompanying drawings, which illustrate, by way of example, one convenient embodiment of the invention, Figure 1 is a side elevation of the improved device, Figure 2 is a plan view of the device with the parts in the position shown in Figure 1, Figure 3 is a side elevation showing the parts in another position, Figure 4 is a section on line 4—4 of Figure 3, and Figure 5 is a section on line 5—5 of Figure 1.

As illustrated in the drawings the invention comprises a main bar 1 of square cross section, provided at one end with a handle 2, and at the other end with a cross piece 3 covered with resilient material, such as rubber 4.

A curved nose piece 5, having a resilient covering 6, is carried by a lever 7, pivoted at 8 between the side walls of a U-shaped bracket 9 which is secured to the bar 1 by rivets 10. The end of the lever 7 which is remote from the nose piece 5 is forked at 11 to straddle the main bar 1. The limbs 11 of the forked end of the lever 7 are arranged between pins 12 and 13 on a bar 14 slidably mounted on the top of the bar 1 and having a loop 15 for engagement by the operator's fore finger.

A lever 16 pivoted at 17 to the bracket 9 has a cross piece 18 normally located vertically beneath the cross piece 3. The cross piece 18 has a covering of resilient material 19 and is normally positioned closely adjacent the underside of cross piece 3. A leaf spring 20, carried by bracket 9, constantly urges the lever 16 upwardly into contact with the underside of a bar 21, slidably mounted on the lower surface of the bar 1, and having a downwardly extending projection 22 engaging a suitably shaped surface 23 on the lever 16. The bar 21, at its other end, has a finger loop 24.

The bars 14 and 21 are slidably maintained in contact with the bar 1 by any suitable means, the means illustrated comprising two small plates 25 bolted to the bar 1 and having their upper and lower edges offset into engagement with grooves 26 in the bars 14 and 21.

Any convenient clamping means may be provided, such as bolts 27 and nuts 28, engaging plates 29 riveted to the opposite sides of the bar 1.

The operation of the device is as follows:

The implement is held by the handle 2 and presented to the animal with the nose piece 5 open and the cross piece 18 closed, as shown in Figure 1. The animal seizes the cross pieces 3 and 18 in its mouth and its upper teeth sink into the resilient material 4 while its lower teeth sink into the covering 19, these resilient coverings being of sufficient thickness to prevent the animal's teeth from coming into contact with the metal of the cross piece 3 and 18. The operator then slides the bar 14 towards the handle 2 by means of the finger loop 15, and the pins 12 slide along the limbs 11 causing the lever 7 to rock on its pivot 8 until the resilient covering 6 of the nose piece 5 engages the animal's nose or snout. The upper nut 28 may then be tightened. The animal is thus securely gripped by the implement and its mouth may then be opened for inspection or administration of medicine by grasping the finger piece 24 and sliding the bar 21 towards the handle 2. This action causes the projection 22 to ride along the surface 23 and force the lever 16 downwardly against the action of the spring 20, until the animal's mouth has been opened to the desired extent, see Figure 3. The lower nut 28 may then be tightened to clamp the bar 21 in this position.

The animal may be released when desired by slackening the nuts 28 and sliding the bars 14 and 21 forwardly. This forward movement of the bars causes the pins 13 to raise the lever 7 to its open position to release the animal's nose and permits the spring 20 to raise the lever 16 to its closed position. The lever 7 may then be returned to its closed position until the implement is to be used again.

It will be readily understood that various modifications may be made in the construction described with reference to the drawings without departing from the scope of the invention as defined in the following claims.

What I claim is:

1. An implement of the kind described comprising a main bar, a pair of members mounted adjacent the end of said bar and normally arranged closely together one above the other so that the upper and lower teeth of an animal may engage the upper and lower members respectively, manually operable means for pressing the animal's nose onto said upper member, and manually operable means for moving one of said members away from the other when desired.

2. An implement for facilitating the capture and handling of animals, comprising a main bar, a cross piece at one end of said bar, a resilient covering on said cross piece, a lever pivotally mounted adjacent said cross piece, a cross piece on one end of said lever above the main bar, a second bar slidably mounted on the main bar and arranged to cause pivotal movement of said lever, a second lever mounted for pivotal movement with respect to the main bar, a cross piece on said second lever, spring means urging said last mentioned cross piece towards the main bar, and a third bar slidably mounted on the main bar and arranged to adjust the distance between the cross pieces on said main bar and second lever.

3. In an implement comprising a member seizable between an animal's teeth, the provision of means for preventing release of the animal's teeth from engagement with said member, and means for forcibly opening the animal's mouth.

4. An implement of the kind described, comprising three bars, a pair of levers, cross pieces on one end of each of said levers and one of said bars, and means whereby longitudinal movement of the other two bars causes a rocking movement of said levers to vary the distance separating said cross pieces.

5. An implement of the kind described comprising a bar having a cross piece at one end thereof, a lever mounted for pivotal movement with respect to said bar, a cross piece on one end of said lever, a spring biasing said lever to a position in which its cross piece is vertically beneath and closely adjacent the cross piece of said bar, adjustable nose-engaging means above said cross pieces, means for operating said nose engaging means and means for rocking said lever.

In testimony whereof I affix my signature.

SAMUEL CAMPBELL.